(12) United States Patent
Yang et al.

(10) Patent No.: US 11,906,841 B2
(45) Date of Patent: Feb. 20, 2024

(54) POLARIZING DEVICE AND METHOD FOR MANUFACTURING POLARIZING DEVICE, DISPLAY PANEL, AND DISPLAY DEVICE

(71) Applicants: Beijing BOE Display Technology Co., Ltd., Beijing (CN); BOE Technology Group Co., Ltd., Beijing (CN)

(72) Inventors: Fan Yang, Beijing (CN); Jingxuan Wang, Beijing (CN); Xu Wang, Beijing (CN); Huiyan Li, Beijing (CN); Yu Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 239 days.

(21) Appl. No.: 17/530,085

(22) Filed: Nov. 18, 2021

(65) Prior Publication Data
US 2022/0276423 A1 Sep. 1, 2022

(30) Foreign Application Priority Data
Feb. 26, 2021 (CN) .......................... 202110220983.X

(51) Int. Cl.
*G02F 1/1335* (2006.01)
*G02B 5/30* (2006.01)

(52) U.S. Cl.
CPC ....... *G02F 1/133541* (2021.01); *G02B 5/305* (2013.01); *G02F 1/133531* (2021.01)

(58) Field of Classification Search
None
See application file for complete search history.

(56) References Cited

U.S. PATENT DOCUMENTS

2016/0187537 A1* 6/2016 Hagio .............. G02F 1/133528
106/170.11
2017/0090072 A1* 3/2017 Maeda ................. G02B 5/3025

* cited by examiner

*Primary Examiner* — Phu Vu
(74) *Attorney, Agent, or Firm* — IPro, PLLC

(57) ABSTRACT

A polarizing device and a method for manufacturing the polarizing device, a display panel and a display device are provided. The polarizing device comprises a first polarizing layer and at least two second polarizing layers, wherein each of two sides of the first polarizing layer is provided with respective at least one of the second polarizing layers; a light transmission axis of the first polarizing layer is parallel to the first polarizing layer, a phase delay axis of the second polarizing layer is parallel to the second polarizing layer, an orthographic projection of the light transmission axis onto the first polarizing layer intersects with an orthographic projection of the phase delay axis onto the first polarizing layer to form an included angle, the included angle is configured to convert linear polarized light incident on the polarization assembly into polarized light emitted from the polarization assembly.

17 Claims, 4 Drawing Sheets

100

100

POLARIZING DEVICE AND METHOD FOR MANUFACTURING POLARIZING DEVICE, DISPLAY PANEL, AND DISPLAY DEVICE

CROSS-REFERENCE TO RELATED APPLICATION

The present disclosure claims priority to Chinese Patent Application No. 202110220983.X filed in China on Feb. 26, 2021, the entire contents of which are hereby incorporated by reference.

TECHNICAL FIELD

The present disclosure relates to the field of display technology, and in particular relates to a polarizing device and a method for manufacturing the polarizing device, a display panel, and a display device.

BACKGROUND

With the development of display technology, the application of the display panel become more and more widely, the liquid crystal display panel is provided with a polarizer, so that the liquid crystal display panel realizes an image display function by converting the light emitted by the backlight source into linear polarized light.

However, for liquid crystal display panels applied to outdoor and vehicle-mounted display devices, in the case where a user wears polarized viewing devices such as polarized sunglasses, polarized near-sighted glasses and three-Dimensional (3D) glasses, the brightness of the liquid crystal display panel viewed by the user at different positions is significantly different; furthermore, the surface of the liquid crystal display panel is mostly made of glass, and the glass has a relatively high reflectivity, so under the irradiation of light, a relatively large amount of light is easily reflected, which further results in the brightness difference of the liquid crystal display panel viewed by the user at different positions.

SUMMARY

The present disclosure provides a polarizing device and a method for manufacturing the polarizing device, a display panel, and a display device.

In a first aspect, embodiments of the present disclosure provide a polarizing device comprising:
a first polarizing layer and at least two second polarizing layers,
wherein each of two sides of the first polarizing layer is provided with respective at least one of the second polarizing layers;
a light transmission axis of the first polarizing layer is parallel to the first polarizing layer, a phase delay axis of the second polarizing layer is parallel to the second polarizing layer, an orthographic projection of the light transmission axis onto the first polarizing layer intersects with an orthographic projection of the phase delay axis onto the first polarizing layer to form an included angle, the included angle is configured to convert linear polarized light incident on the polarization assembly into polarized light emitted from the polarization assembly, a cross section of the polarized light is of a closed curve pattern, and the cross section is perpendicular to an light-emitting direction of the polarized light.

In a second aspect, embodiments of the present disclosure provide a display panel comprising a polarizer and the polarizing device provided in the above first aspect, wherein the polarizer is arranged at a light emitting side of the display panel, the polarizing device is arranged at a light emitting side of the polarizer, and a light transmission axis of the first polarizing layer in the polarizing device is parallel to a light transmission axis of the polarizer.

In a third aspect, embodiments of the present disclosure provide a display device comprising the display panel provided in the second aspect, or the polarizing device provided in the first aspect.

In a fourth aspect, embodiments of the present disclosure provide a method of manufacturing a polarizing device comprising:
attaching respective at least one second polarizing layer onto each of two sides of the first polarizing layer, to enable an orthographic projection of a light transmission axis of the first polarizing layer onto the first polarizing layer to intersect with an orthographic projection of a phase delay axis of the second polarizing layer onto the first polarizing layer to form an included angle; the light transmission axis being parallel to the first polarizing layer, the phase delay axis being parallel to the second polarizing layer, the included angle being configured to convert the linear polarized light incident on a polarizing component into polarized light emitted from the polarization assembly, a cross section of the polarized light being of a closed curve pattern, and the cross section being perpendicular to an light-emitting direction of the polarized light.

Additional aspects and advantages of the disclosure will be set forth in part in the description which follows, and in part will be obvious from the description, or may be learned by practice of the disclosure.

BRIEF DESCRIPTION OF THE DRAWINGS

The foregoing and/or additional aspects and advantages of the disclosure will become apparent and more readily appreciated from the following description of the embodiments, taken in conjunction with the accompanying drawings of which.

DETAILED DESCRIPTION

Figure 1:
FIG. 1 is a schematic illustration of a polarizer assembly according to an embodiment of the present disclosure.

Reference will now be made in detail to the present disclosure, examples of embodiments of which are illustrated in the accompanying drawings, wherein like or similar reference numerals refer to the same or similar elements or elements having the same or similar function throughout. Further, if a detailed description of known technology is not necessary for illustrating the features of the present disclosure, it is omitted. The embodiments described below by referring to the figures are exemplary only and should not be construed as limiting the disclosure.

It will be understood by those skilled in the art that, unless otherwise defined, all terms (including technical and scientific terms) used herein have the same meaning as commonly understood by one of ordinary skills in the art to which this disclosure belongs. It will be further understood that terms, such as those defined in commonly used dictionaries, should be interpreted as having a meaning that is consistent with their meaning in the context of the related art and will not be interpreted in an idealized or overly formal sense unless expressly so defined herein.

As used herein, the singular forms "a", "an", "the" and "the" are intended to include the plural forms as well, unless expressly stated otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" to another element, it can be directly connected to the other element or intervening elements may also be present. As used herein, the term "and/or" includes all or any unit and all combinations of one or more of the associated listed items.

A liquid crystal display device in the related art comprises a backlight source and a liquid crystal display panel, wherein the liquid crystal display panel mainly comprises an upper polarizer, a color filter layer, a liquid crystal layer, a TFT (Thin Film Transistor) and a lower polarizer, the upper polarizer is arranged on a light-emitting side of the liquid crystal layer, the lower polarizer is arranged on a light incident side of the liquid crystal layer, and a light transmission axis of the upper polarizer and a light transmission axis of the lower polarizer are vertically arranged at 90°. By controlling the polarization degree of the light emitted from the liquid crystal display panel, a display function is realized. A liquid crystal display device applied outdoors usually further comprises a glass cover plate arranged at a light emitting side of the liquid crystal display panel to protect the liquid crystal display panel.

The inventors of the present disclosure have studied and found that in the case where the light transmission axis of the lower polarizer is 90° and the light transmission axis of the upper polarizer is 0°, natural light emitted from the backlight source passes through the lower polarizer to be linearly polarized in a vertical direction, enters the liquid crystal layer, the polarization direction of the light is changed by the birefringence effect of the liquid crystal layer, and then passes through the upper polarizer, so that only linear polarized light with a polarization direction of 0° can be emitted from the liquid crystal display panel.

However, in the case where the user wears a polarized observation device such as polarized sunglasses, polarized near-sight glasses and 3D glasses, the brightness of the liquid crystal display panel viewed by the user at different positions is significantly different. Furthermore, the glass cover plate has a relatively high reflectivity, and under the irradiation of external light, a relatively large amount of light is easily reflected, further leading to aggravation of the brightness difference of the liquid crystal display panel viewed by the user at different positions.

The present disclosure provides a polarizing device and a method for manufacturing the polarizing device, a display panel, and a display device, aiming to solve the above technical problems of the related art.

The technical solutions of the present disclosure and how the technical solutions of the present disclosure solve the above-mentioned technical problems are described in detail in the following specific embodiments.

Figure 2:
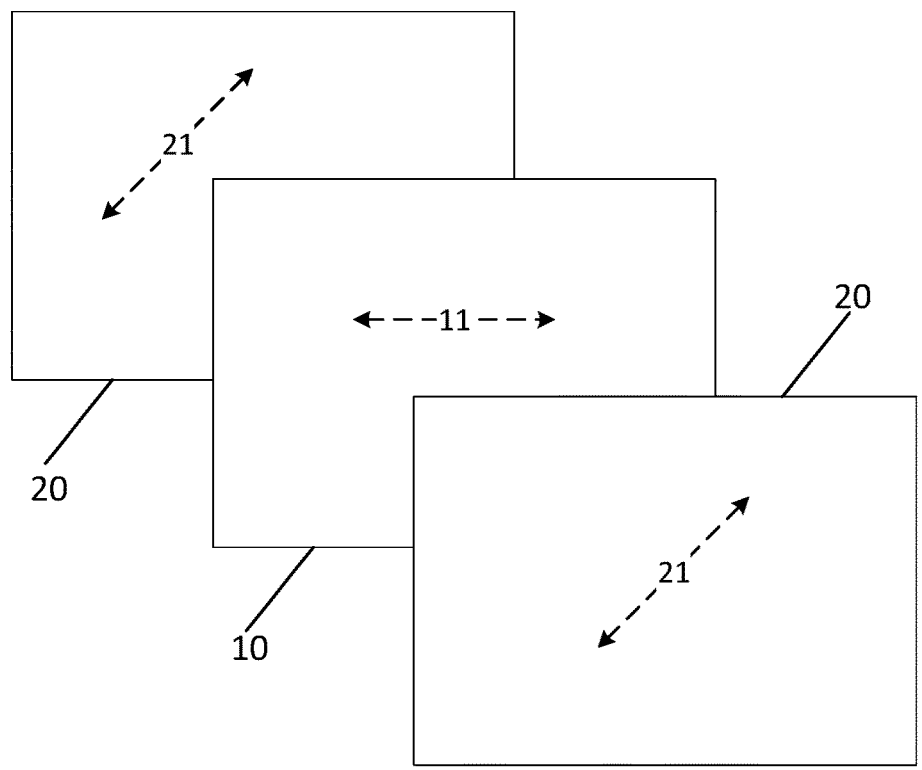
FIG. 2 is a schematic top view of an exploded configuration of the polarizer assembly of FIG. 1 provided in accordance with an embodiment of the present disclosure.
Figure 8:
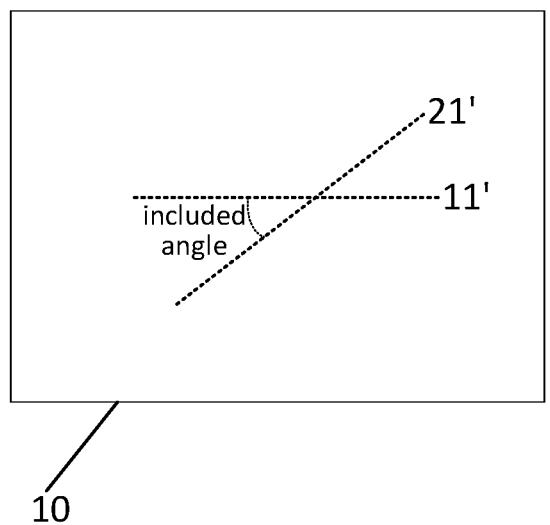
FIG. 8 is a schematic illustration of an included angle in a polarizing device provided by an embodiment of the present disclosure.

Embodiments of the present disclosure provide a polarizing device, as shown in FIG. 1, which is a schematic view of the structure of the display panel, and as shown in FIG. 2, which is a schematic top view of the exploded structure of the polarizing device of FIG. 1. The polarizing device 100 comprises: a first polarizing layer 10 and at least two second polarizing layers 20, wherein both sides of the first polarizing layer 10 being provided with at least one second polarizing layer 20; the light transmission axis 11 of the first polarizing layer 10 is parallel to the first polarizing layer 10, the phase delay axis 21 of the second polarizing layer 20 is parallel to the second polarizing layer 20, and the orthographic projection 11' of the light transmission axis 11 on the first polarizing layer 10 intersects with the orthographic projection 21' of the phase delay axis 21 on the first polarizing layer 10 to form an included angle. As shown in FIG. 8, the included angle is configured to convert linear polarized light that enters the polarizing device 100 into polarized light that exits the polarizing device 100 in a closed curve pattern in cross-section that being perpendicular to an light-emitting direction of the polarized light. Optionally, the respective at least two phase delay axes 21 of the at least two second polarizing layers 20 are parallel to each other. In the polarizing device 100 provided by the embodiments of the present disclosure, at least one second polarizing layer 20 is provided on both sides of the first polarizing layer 10, and the orthographic projection 11 'of the transmission axis 11 of the first polarizing layer 10 intersects with the orthographic projection 21' of the phase delay axis 21 of the second polarizing layer 20 to form an included angle, so that the incident linear polarized light is converted into linear polarized light with a closed curve pattern in cross section by the phase compensation of the second polarizing layer 20. Compared with the linear polarized light, the vibration direction of the polarized light with a closed curve pattern in cross section is rotated on the propagation plane and has an isotropic characteristic, so that the visual viewing angle of the light emitted from the polarizing device 100 can be expanded; and by arranging the polarizing device 100 on the light emitting side of the liquid crystal display panel, the visual viewing angle of the display screen of the liquid crystal display panel can be increased, thereby solving the problem that when a user wears the polarizing observation device, the brightness of the liquid crystal display panel viewed by the user at different positions will be significantly different.

In the embodiments of the present disclosure, a closed curve pattern refers to the cross-sectional shape of a trajectory traced out by the endpoint of the light vector on a plane perpendicular to the propagation direction or the direction of the electric field of the exiting polarized light.

It should be noted that since the transmission axis 11 is not the actual physical structure of the first polarizing layer 10, the transmission axis 11 is indicated by a dotted line in FIG. 2, and similarly, the phase delay axis 21 is indicated by a dotted line in FIG. 2.

In the embodiment of the present disclosure, the transmission axis 11 of the first polarizing layer 10 is parallel to the first polarizing layer 10, the phase delay axis 21 of the second polarizing layer 20 is parallel to the second polarizing layer 20. Due to the included angle formed by the intersection of the orthographic projection 11' of the transmission axis 11 and the orthographic projection 21' of the phase delay axis 21, the incident linear polarized light is converted into a polarized light with a closed curve pattern in cross section by the phase compensation of the second polarizing layer 20, so as to emit the polarized light with the closed curve pattern. Since the light vector of the emitted polarized light rotates continuously and the direction changes regularly with time, the polarization direction of the emitted polarized light is uniformly distributed with the change of time, so that the visual viewing angle of the emitted polarized light of the polarizing device 100 can be expanded, and the polarizing device 100 is arranged on the light-emitting side of the liquid crystal display panel, so that the visual viewing angle of the display screen of the liquid crystal display panel can be increased, and furthermore, when a user wears a polarizing observation device, the problem that the brightness of the liquid crystal display panel viewed by the user at different positions will be significantly different can be solved, and the use experience of the user can be ensured.

Furthermore, when the polarizing device 100 is arranged on the light-emitting side of the glass cover plate, incident light from the outside will successively pass through the second polarizing layer 20 arranged on the light-emitting side of the first polarizing layer 10, the first polarizing side 10 and the second polarizing layer 20 arranged on the light-entering side of the first polarizing layer 10 to reach the surface of the glass cover plate and/or the display panel. It should be noted that the light-emitting side and the light-entering side of the first polarizing layer 10 are relative to the light emitted from the display panel.

The external incident light is natural light, and after passing through the polarizing device 100, polarized light with a closed curve pattern in a cross section having a first rotation direction is formed; and after the polarized light with a closed curve pattern in a cross section having a first rotation direction is reflected by the glass cover plate and/or the display panel, polarized light with a closed curve pattern in a cross section having a second rotation direction is formed. Due to the specular reflection of the glass cover plate and/or the display panel, the second rotation direction is opposite to the first rotation direction, so that polarized light having a closed curve pattern in cross-section with the second rotation direction can no longer pass through the polarizing device 100. Thus, the amount of the external light reflected by the glass cover plate and/or the display panel can be reduced, the influence of the reflected external light on the user's view of the display screen of the display panel can be reduced, and the visual angle of the display screen of the display panel can be further increased.

In an embodiment of the present disclosure, the included angle formed by the intersection of the orthographic projection 11' of the transmit axis 11 and the orthographic projection 21' of the phase delay axis 21 ranges from being not less than 42° and no more than 48°. When the range of the included angle formed by the intersection of the orthographic projection 11' of the light transmission axis 11 and the orthographic projection 21' of the phase delay axis 21 is not less than 42° and no more than 48°, the linear polarized light incident on the polarization assembly is converted into the polarized light emitted from the polarization assembly in a closed curve pattern in cross section, which is perpendicular to a light-emitting direction of the polarized light, by the phase compensation of the second polarizing layer 20, so that the viewing angle of the polarized light emitted from the polarization assembly can be enlarged.

In an embodiment of the present disclosure, the closed curve pattern comprises at least one of a circle and an ellipse. The person skilled in the art would understand that when the closed curve pattern is a circle, that is, the trace of the endpoint of the light vector of the light-emitting polarized light is a circle, the light vector rotates continuously, and the size is unchanged, but the polarization direction changes regularly with time, and at this time, the emergent polarized light is circular polarized light, and when the closed curve pattern is an ellipse, that is, the trace of the endpoint of the light vector of the emergent polarized light is an ellipse, the light vector rotates continuously, and the size thereof is constant, but the polarization direction changes regularly with time, and at this time, the emergent polarized light is an elliptical polarized light. The polarization directions of circular polarized light and elliptical polarized light are uniformly distributed with time, which can well simulate the characteristics of the same polarization direction of natural light. The comprehensive effect on human eyes is also isotropic, and the polarization components in any direction keep constant. Compared with linear polarized light, the eye fatigue can be effectively reduced.

Optionally, when the included angle between the light transmission axis 11 and the phase delay axis 21 is 45°, and the closed curve pattern is circular, the emitted polarized light is circular polarized light, and when the included angle between the light transmission axis 11 and the phase delay axis 21 is any angle of being not less than 42° and less than 45°, or any angle of being more than 45° and being no more than 48°, the closed curve pattern is elliptical, and at this time, the emitted polarized light is elliptical polarized light.

In an embodiment of the present disclosure, the amount of phase delay of the second polarizing layer 20 ranges from not less than 6000 nm to no more than 10000 nm. In the embodiments of the present disclosure, when the phase delay amount of the second polarizing layer 20 is in the range of being not less than 6000 nm and being no more than 10000 nm, the second polarizing layer 20 can satisfy phase compensation in the visible light band, and it should be noted that the wavelength range of the visible light band is 380-780 nm.

Optionally, the wavelength of the incident linear polarized light is in the range of being not less than 380 nm and being no more than 780 nm, and the polarization degree of the second polarizing layer 60 is in the range of being not less than 1% and being no more than 6%. Optionally, when the wavelength of the incident visible light is in the range of being not less than 380 nm and being no more than 780 nm, it is converted into linear polarized light in the wavelength range of being not less than 380 nm and being no more than 780 nm by the action of the first polarizing layer 10, and since the polarization degree of the second polarizing layer 60 is in the range of being not less than 1% and being no more than 6%, light of most wavebands in the wavelength range of visible light can be converted into polarized light with a closed curve pattern in cross section to be emitted, so that the emergent light of the polarizing device 100 at various angles does not have a significant chromatic aberration phenomenon.

After the visible light with a wavelength of 380-780 nm passes through the second polarization layer 20 arranged on the light incident side of the first polarization layer 10, the second polarization layer 20 will emit visible light with a wavelength of 380-780 nm, and after the natural light with a wavelength of 380-780 nm passes through the first polarization layer 10, the natural light with a wavelength of 380-780 nm becomes linear polarized light with a wavelength of 380-780 nm, and after the linear polarized light with a wavelength of 380-780 nm passes through the second polarization layer 20 arranged on the light-emitting side of the first polarization layer 10, due to the phase compensation of the second polarization layer 20, the linear polarized light having a wavelength of 380 to 780 nm is converted into polarized light having a cross section of a closed curve pattern having a wavelength of 380 to 780 nm.

In an embodiment of the present disclosure, the second polarizing layer 20 is made of a material comprising polyethylene terephthalate.

In the embodiments of the present disclosure, by stretching a PET (PolyEthylene Terephthalate) substrate, the refractive index of the PET substrate in the XY plane during the stretching process has a birefringence effect according to the strain rate difference, that is, the stretched PET substrate has anisotropy, so that the PET substrate has a phase compensation function, and the incident linear polarized light is converted into polarized light with a closed curve pattern in cross section and is emitted. Furthermore, the PET has a certain strength and can function to support and protect the first polarizing layer 10.

Furthermore, since the PET material is widely available and inexpensive, the stretching process for manufacturing the second polarizing layer 20 by the PET is simple, and the manufacturing cost of the second polarizing layer 20 can be greatly reduced compared to quarter wave plate in the related art, thereby reducing the manufacturing cost of the polarizing device 100.

Figure 3:
FIG. 3 is a schematic illustration of another polarizer assembly provided in accordance with an embodiment of the present disclosure.

In an embodiment of the present disclosure, as shown in FIG. 3, in the polarizing device 100, a side of a first polarizing layer 10 is provided with a first supporting and protecting layer 30, a side of the first supporting and protecting layer 30 distal to the first polarizing layer 10 is provided with a protective film layer 40, and a side of the protective film layer 40 distal to the first polarizing layer 10 is provided with at least one second polarizing layer 20, and the other side of the first polarizing layer 10 is provided with a second supporting and protecting layer 50, and the side of the second supporting and protecting layer 50 distal to the first polarizing layer 10 is provided with at least one second polarizing layer 20.

In the embodiment of the present disclosure, the first supporting and protecting layer 30 and the second supporting and protecting layer 50 play the role of supporting and protecting the first polarizing layer 10, and the first supporting and supporting layer 30 and the second supporting and protecting layer 50 can be prevented from being scratched and damaged during the process of attaching the second polarizing layer 20, thereby affecting the light transmittance of the polarizing device 100.

It should be noted that a PSA (Primary Secondary Amine) adhesive layer can be disposed between the first polarizing layer 10 and the second polarizing layer 20 to realize the bonding of the first polarizing layer 10 and the second polarizing layer 20.

Figure 4:
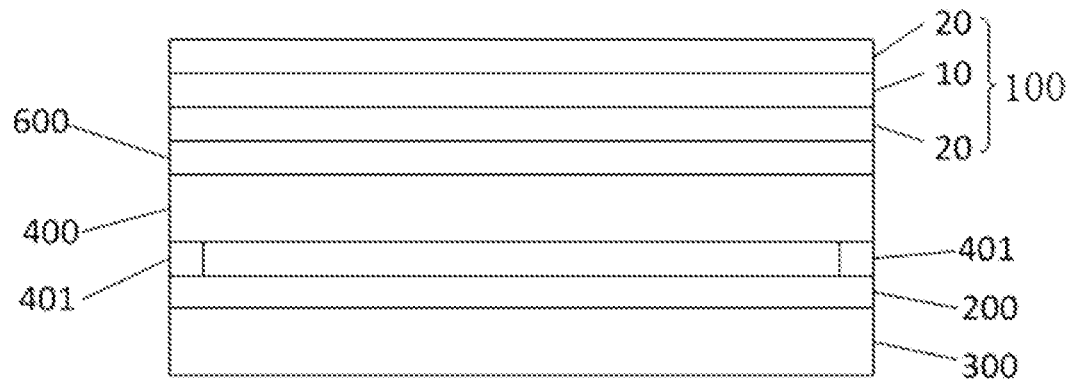
FIG. 4 is a schematic view showing the structure of the display panel according to an embodiment of the present disclosure.
Figure 5:
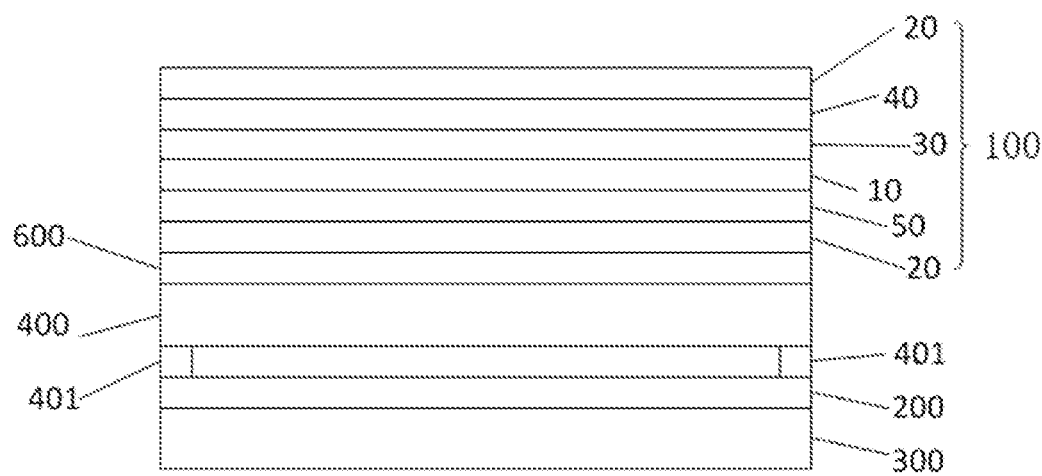
FIG. 5 is a schematic view showing a structure of another display panel according to an embodiment of the present disclosure.

Based on the same inventive concept, the embodiments of the present disclosure provide a display panel. As shown in FIGS. 4 and 5, the display panel comprises a polarizer 200 and the polarizing device 100 provided in the above-mentioned embodiments, wherein the polarizer 200 is arranged on the light-emitting side of the display panel 300, the polarizing device 100 is arranged on the light-emitting side of the polarizer 200, and the light transmission axis 11 of the first polarizing layer 10 in the polarizing device 100 is parallel to the light transmission axis of the polarizer 200. The polarizer assembly 100 is attached to the polarizer 200 via an adhesive layer 600, which comprises the PSA in the embodiment of the present disclosure.

Optionally, the display panel further comprises a glass cover plate 400, which is arranged between the light-emitting side of the polarizer 200 and the polarizer assembly 100, wherein the glass cover plate 400 and the polarizer 200 are attached in a frame pasting manner via a frame pasting structure 401, and the frame pasting structure 401 comprises an adhesive.

Figure 6:
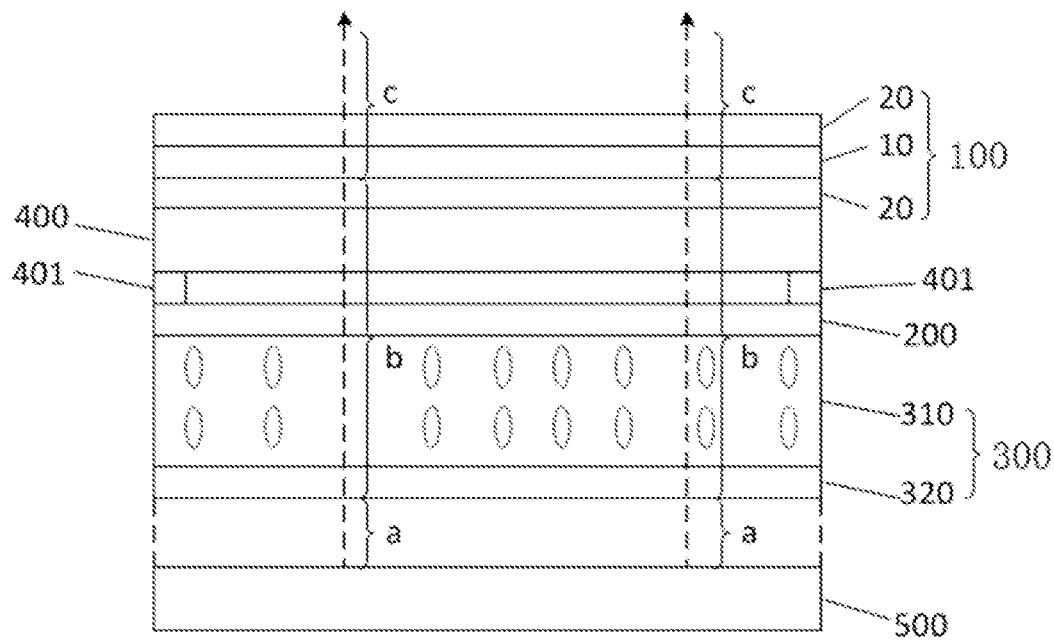
FIG. 6 is a schematic diagram showing a light-emitting path of light emitted from a backlight source in a display panel according to an embodiment of the present disclosure.

In the embodiments of the present disclosure, the display panel 300 specifically is a liquid crystal display panel, and the display panel 300 comprises a liquid crystal layer 310 and a lower polarizer 320 arranged on the side of the liquid crystal layer 310 distal to the polarizer 200. As shown in FIG. 6, a schematic diagram of a light-emitting path of light emitted by a backlight source 500 in a display panel is shown. The light emitted by the backlight source 500 is converted into linear polarized light with a first polarization direction after passing through a lower polarizer 320, and the linear polarized light with the first polarization direction is converted into linear polarized light with a second polarization direction after passing through a liquid crystal layer 310 and a polarizer 200, and a side of the linear polarized light with the second polarization direction enters a polarizing device 100 after passing through a glass cover plate 400, and the incident linear polarized light with the second polarization direction is converted into circular polarized light and exits through the polarizing device 100. Thus, the visual angle of the display screen of the display panel can be increased, and the problem that there is significant difference of the brightness of the liquid crystal display panel viewed by the user at different positions when the user wears the polarization observation device can be solved, and the user's use experience can be ensured.

In the embodiment of the present disclosure, in FIG. 6, a certain gap is provided between the backlight source 500 and the lower polarizer 320 in order to show an exit path of light emitted from the backlight source 500, and a connection relationship between the backlight source 500 and the lower polarizer 320 is indicated by a dotted line. Meanwhile, a light ray is indicated by a dotted line. In FIG. 6, a indicates white light emitted from an external natural light or a backlight source 500, b indicates linear polarized light, and c indicates circular polarized light.

Figure 7:
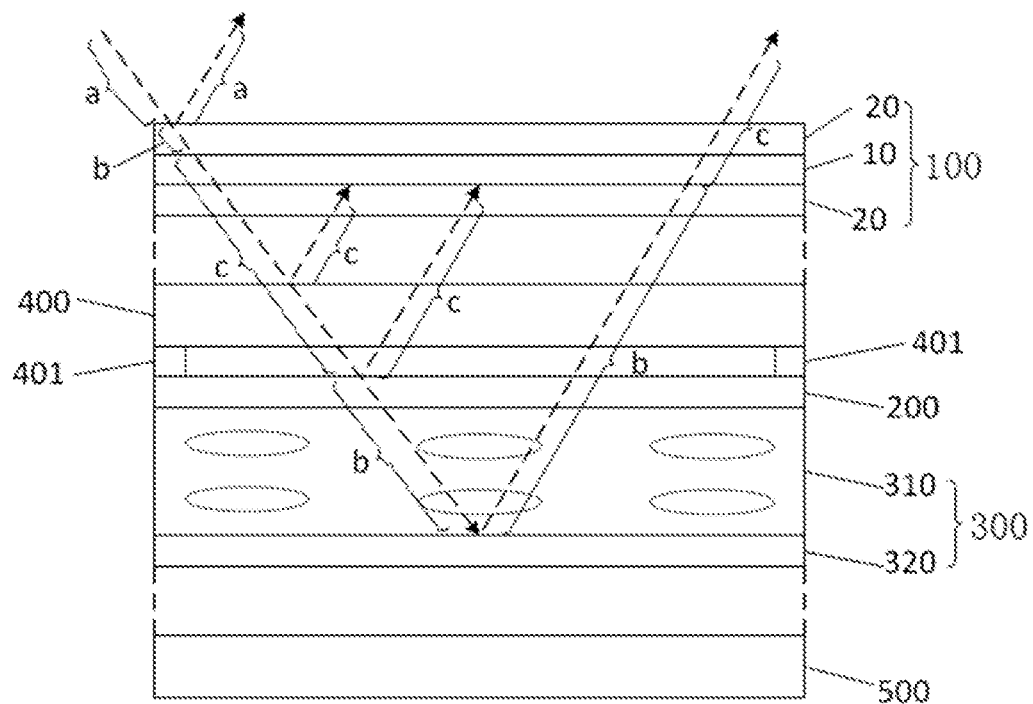
FIG. 7 is a schematic diagram of a reflected light path of ambient light of a display panel provided by an embodiment of the present disclosure.

FIG. 7 is a schematic diagram showing the reflected light path of the ambient light of the display panel. The external incident light is natural light, and after passing through the polarizing device 100, circular polarized light having a first rotation direction will be formed, and when a part of the circular polarized light having the first rotation direction is incident on the glass cover plate 400, specular reflection will occur on the surface of the glass cover plate 400, so that the part of the circular polarized light having the first rotation direction is converted into circular polarized light having a second rotation direction, and since the second rotation direction is opposite to the first rotation direction, the circular polarized light having the second rotation direction can no longer pass through the polarizing device 100 to be emitted, and when a part of the circular polarized light of the first rotation direction is incident on the polarizer 200 through the glass cover plate 400, specular reflection will occur on the surface of the polarizer 200, so that the part of the circular polarized light having the first rotation direction is converted into circular polarized light having the second rotation direction, and by the same reasoning, the circular polarized light of the second rotation direction can no longer be emitted through the polarizing device 100, and the remaining part of the circular polarized light having the first rotation direction passes through the glass cover plate 400, the polarizer 200 and the liquid crystal layer 310 in sequence, after being reflected by the polarizer 200, passes through the liquid crystal layer 310, the polarizer 200, the glass cover plate 400 and the polarizing device 100 in sequence, and then exits.

In the embodiment of the present disclosure, the external incident light is blocked from being emitted by the polarizing device 100, so that the existing light reflected by the glass cover plate 400 and the polarizer 200 is reduced, and the influence of the reflected external light on the user's viewing of the display of the display panel can be reduced, thereby further increasing the visual viewing angle of the display of the display panel.

It is noted that in FIG. 7, in order to explain the exit path of the light reflected by the glass cover plate 400 and the polarizer 200, a certain gap is provided between the polarizer assembly 100 and the glass cover plate 400, and the connection relationship between the polarizer assembly 100 and the glass cover plate 400 is indicated by a dotted line. Meanwhile, a light ray is indicated by a dotted line. In FIG. 7, a indicates white light emitted from an external natural light or a backlight source 500, b indicates linear polarized light, and c indicates circular polarized light.

Furthermore, when the polarizing device 100 is arranged on the light-emitting side of the glass cover plate, incident light raying from the outside will successively pass through the second polarizing layer 20 arranged on the light-emitting side of the first polarizing layer 10, the first polarizing side 10 and the second polarizing layer 20 arranged on the light-entering side of the first polarizing layer 10 to reach the surface of the glass cover plate and/or the display panel. It is noted that the light-emitting side and the light-entering side of the first polarizing layer 10 are relative to the light rays emitted from the display panel.

Based on the same inventive concept, embodiments of the present disclosure provide a display device including the display panel 300 provided in each of the above-described embodiments or the polarizing device 100 provided in each of the above-described embodiments.

Based on the same inventive concept, embodiments of the present disclosure provide a method of manufacturing a polarizing device, comprising: attaching at least one second polarizing layer 20 on both sides of the first polarizing layer 10, so that the orthographic projection 11' of the light transmission axis 11 of the first polarizing layer 10 on the first polarizing layer 10 intersects with the orthographic projection 21' of the phase delay axis 21 of the second polarizing layer 20 on the first polarizing layer 10 to form an included angle; the light transmission axis 11 is parallel to the first polarizing layer 10, and the phase delay axis 21 is parallel to the second polarizing layer 20 and the included angle is configured to convert linear polarized light that enters the polarizing device 100 into polarized light that exits the polarizing device 100 in a closed curve pattern in cross-section that is perpendicular to an light-emitting direction of the polarized light.

In an embodiment of the present disclosure, the substrate is stretched in either direction parallel to the substrate such that the phase delay of the substrate is in the range of being not less than 6000 nm and being no more than 10000 nm, resulting in the second polarizing layer 20. Optionally, the PET substrate is stretched in any direction parallel to the PET substrate such that the phase delay of the PET substrate ranges from not less than 6000 nm to no more than 10000 nm, resulting in the second polarizing layer 20.

In an embodiment of the present disclosure, at least one second polarizing layer 20 is attached on both sides of the first polarizing layer 10, so that an orthographic projection 11' of a light transmission axis 11 of the first polarizing layer 10 on the first polarizing layer 10 intersects with an orthographic projection 21' of a phase delay axis 21 of the second polarizing layer 20 on the first polarizing layer 10 to form an included angle, comprising: attaching at least one layer of the second polarizing layer 20 on a side of the protective film layer 40 arranged on a side of the first polarizing layer 10, so that the orthographic projection 11' of the light transmission axis 11 of the first polarizing layer 10 on said first polarizing layer 10 intersects with the orthographic projection 21' of the phase delay axis 21 of the second polarizing layer 20 attached on a side of the protective film layer 40 on said first polarizing layer 10 to form an included angle; at least one layer of the second polarizing layer 20 is adhered on a side of the second supporting and protecting layer 50 arranged on the other side of the first polarizing layer 10, so that the orthographic projection 11' of the light transmission axis 11 of the first polarizing layer 10 on said first polarizing layer 10 intersects with the orthographic projection 21' of the phase delay axis 21 of the second polarizing layer 20 adhered on a side of the second supporting protective layer 50 on said first polarizing layer 10 to form an included angle.

In the related art, since both the first polarizing layer 10 and the second polarizing layer 20 have a certain flexibility, during the process of directly attaching the first polarizing layer 10 and the second polarizing layer 20, the first polarizing layer 10 and the second polarizing layer 20 are not easily aligned, so that the included angle between the light transmission axis 11 and the phase delay axis 21 does not match the included angle, resulting in a low production yield of the polarizing device 100.

In the embodiments of the present disclosure, by providing a first supporting and protecting layer 30 between the first polarizing layer 10 and the protective film layer 40, and the first supporting and protecting layer 30 has a certain supporting strength, and thus, by supporting the first polarizing layer 10 by the first supporting and protecting layer 30, the second polarizing layer 20 can be easily attached to the first polarizing layer 10, so that the production yield of the polarizing device 100 can be improved. By the same reasoning, by providing the second supporting and protecting layer 50 on a side of the first polarizing layer 10, the production yield of the polarizing device 100 can be further improved.

In the embodiment of the present disclosure, the first support protective layer 30 and the second support protective layer 50 are made of any one of PET or TAC (TriAcetyl Cellulose).

With the embodiment of the present disclosure, at least the following advantageous effects can be achieved.

1. In the polarizing device provided by the embodiments of the present disclosure, by providing at least a second polarizing layer 20 on both sides of the first polarizing layer 10, and the light transmission axis 11 of the first polarizing layer 10 has an included angle relative to the phase delay axis 21 of the second polarizing layer 20, and then the incident linear polarized light is converted into polarized light with a closed curve pattern in cross section by the phase compensation of the second polarizing layer 20. Compared with the linear polarized light, the vibration direction of the polarized light with a closed curve pattern in cross section is rotated on the propagation plane and has an isotropic characteristic, so that the visual viewing angle of the light emitted from the polarizing device can be expanded, and by arranging the polarizing device on the light emitting side of the liquid crystal display panel, the visual viewing angle of the display screen of the liquid crystal display panel can be increased, thereby solving the problem that when a user wears the polarizing observation device, the brightness of the liquid crystal display panel viewed by the user at different positions will be significantly different.

2. When the polarizing device 100 is arranged on the light-emitting side of the glass cover plate, incident light from the outside passes through the second polarizing layer 20 arranged on the light-emitting side of the first polarizing layer 10, the first polarizing side 10 and the second polarizing layer 20 arranged on the light-entering side of the first polarizing layer 10 successively to reach the surface of the glass cover plate and/or the display panel. It should be noted that the light-emitting side and the light-entering side of the first polarizing layer 10 are relative to the light emitted from the display panel.

The external incident light is the natural light, and after passing through the polarizing device 100, linear polarized light with a closed curve pattern in a cross section having a first rotation direction is formed, and after the linear polarized light with a closed curve pattern in a cross section having a first rotation direction is reflected by the glass cover plate and/or the display panel, polarized light with a closed curve pattern in a cross section having a second rotation direction is formed. Due to the specular reflection of the glass cover plate and/or the display panel, the second rotation direction is opposite to the first rotation direction, so that polarized light having a closed curve pattern in cross-section with the second rotation direction can no longer pass through the polarizing device 100. Thus, the amount of the external light reflected by the glass cover plate and/or the display panel can be reduced, the influence of the reflected external light on the user's view of the display screen of the display panel can be reduced, and the visual angle of the display screen of the display panel can be further increased.

It is understood by a person skilled in the art that the various operations, methods, steps, measures and schemes discussed in the present disclosure can be replaced, changed, combined or deleted. Further, the present disclosure discusses various operations, methods, steps, measures, schemes in the process that can be alternated, changed, rearranged, decomposed, combined, or deleted. Further, various operations, methods, steps, acts, schemes, etc. disclosed in the related art may be alternated, altered, rearranged, decomposed, combined, or deleted.

In the description of the present disclosure, it should be understood that the terms "center", "upper", "lower", "front", "back", "left", "right", "vertical", "horizontal", "top", "bottom", "inner", "outer", and the like, are based on the orientation or positional relationships shown in the drawings, merely to facilitate and simplify the description of the present disclosure, and do not indicate or imply that the referenced devices or elements have a particular orientation, and be constructed and operated in a particular orientation, thus should not be construed as the limitation of the present disclosure.

The terms "first" and "second" are used for descriptive purposes only and are not to be construed as indicating or implying relative importance or as implicitly designating the number of technical features indicated. Thus, a feature defined as "first" or "second" may explicitly or implicitly comprise one or more of the features. In the description of the present disclosure, the meaning of "a plurality" means two or more than two, unless otherwise specified.

In the description of the present disclosure, it is to be noted that, unless expressly stated or limited otherwise, the terms "mounted", "connected", and "coupled" are to be interpreted in a broad sense, as a detachable connection, or an integral connection; it can be directly connected or indirectly connected through an intermediate medium, and can be connected between two elements. For the person skilled in the art, the specific meaning of the above terms in the present disclosure is to be understood on a case-by-case basis.

In the description of the specification, particular features, structures, materials, or characteristics combine in suitable manner in any one or more embodiments or examples.

It should be understood that, although the various steps in the flowcharts of the figures are shown in order as indicated by the arrows, the steps are not necessarily performed in the order indicated by the arrows. Unless specified otherwise herein, the steps are performed in no strict order and may performed in other orders. Furthermore, at least some of the steps in the flowcharts of the figures include a plurality of sub-steps or stages, which are not necessarily performed at the same time, and can be performed at different times, in a different order, and may be performed in turn or in alternation with at least some of the other steps or sub-steps or stages of other steps.

The above are embodiments of the present disclosure, and it should be noted that a person skilled in the art may many modifications and the improvements without departing from the principle of the present disclose, and these modifications and improvements shall fall within the scope of the present disclosure.

What is claimed is:

1. A polarizing device, comprising:
a first polarizing layer and at least two second polarizing layers,
wherein each of two sides of the first polarizing layer is provided with respective at least one of the second polarizing layers;
a light transmission axis of the first polarizing layer is parallel to the first polarizing layer, a phase delay axis of the second polarizing layer is parallel to the second polarizing layer, an orthographic projection of the light transmission axis onto the first polarizing layer intersects with an orthographic projection of the phase delay axis onto the first polarizing layer to form an included angle, the included angle is configured to convert linear polarized light incident on the polarization assembly into polarized light to be emitted from the polarization assembly, a cross section of the polarized light to be emitted from the polarization assembly is of a closed curve pattern, and the cross section is perpendicular to an light-emitting direction of the polarized light,
wherein the second polarizing layer has a phase delay in a range of being not less than 6000 nm and being no more than 10000 nm.

2. The polarizing device according to claim 1, wherein the included angle ranges from being not less than 42° and being no more than 48°.

3. The polarizing device according to claim 1, wherein the closed curve pattern comprises at least one of a circle and an ellipse.

4. The polarizing device according to claim 3, wherein the included angle is 45°, the closed curve pattern is circular; or the included angle is any angle of being not less than 42° and being less than 45°, or any angle of being more than 45° and being no more than 48°, and the closed curve pattern is an ellipse.

5. The polarizing device according to claim 1, wherein wavelength of the incident linear polarized light is in a range of being not less than 380 nm and being no more than 780 nm, polarization of the second polarizing layer is in a range of being not less than 1% and being no more than 6%.

6. The polarizing device according to claim 1, wherein the second polarizing layer is made of a material comprising polyethylene terephthalate.

7. The polarizing device according to claim 1, wherein a side of the first polarizing layer is provided with a first supporting protective layer, a side of the first supporting protective layer distal to the first polarizing layer is provided with a protective film layer, and a side of the protective film layer distal to the first polarizing layer is provided with at least one of the second polarizing layers;

the other side of the first polarizing layer is provided with a second supporting protective layer, and a side of the second supporting protective layer distal to the first polarizing layer is provided with at least one of the second polarizing layers.

8. The polarizing device according to claim 1, wherein respective at least two phase delay axes of the at least two second polarizing layers are parallel to each other.

9. A display panel comprising a polarizer and the polarizing device according to claim 1, wherein the polarizer is arranged at a light emitting side of the display panel, the polarizing device is arranged at a light emitting side of the polarizer, and a light transmission axis of the first polarizing layer in the polarizing device is parallel to a light transmission axis of the polarizer.

10. The display panel according to claim 9, further comprising a glass cover plate arranged between the light emitting side of the polarizer and the polarizing device.

11. A display device comprising the display panel according to claim 9.

12. The display device according to claim 11, wherein the included angle ranges from being not less than 42° and being no more than 48°.

13. The display device according to claim 11, wherein the closed curve pattern comprises at least one of a circle and an ellipse.

14. The display device according to claim 13, wherein the included angle is 45°, the closed curve pattern is circular; or the included angle is any angle of being not less than 42° and being less than 45°, or any angle of being more than 45° and being no more than 48°, and the closed curve pattern is an ellipse.

15. A display device comprising the display panel according to claim 9.

16. A method for manufacturing a polarizing device, comprising:

attaching respective at least one second polarizing layer onto each of two sides of the first polarizing layer, to enable an orthographic projection of a light transmission axis of the first polarizing layer onto the first polarizing layer to intersect with an orthographic projection of a phase delay axis of the second polarizing layer onto the first polarizing layer to form an included angle; the light transmission axis being parallel to the first polarizing layer, the phase delay axis being parallel to the second polarizing layer, the included angle being configured to convert linear polarized light incident on a polarizing component into polarized light to be emitted from the polarization assembly, a cross section of the polarized light being of a closed curve pattern, and the cross section being perpendicular to an light-emitting direction of the polarized light, wherein a substrate is stretched in any direction parallel to the substrate, to enable a phase delay of the substrate to be in a range of being not less than 6000 nm and being no more than 10000 nm to obtain the second polarizing layer.

17. The method for manufacturing the polarizing device according to claim 16, wherein attaching the respective at least one second polarizing layer onto each of two sides of the first polarizing layer, to enable the orthographic projection of the light transmission axis of the first polarizing layer onto the first polarizing layer to intersect with an orthographic projection of a phase delay axis of the second polarizing layer onto the first polarizing layer to form an included angle, comprising:

attaching the at least one second polarizing layer onto a side of the protective film layer provided on a side of the first polarizing layer, to enable the orthographic projection of the light transmission axis of the first polarizing layer onto the first polarizing layer intersect with the orthographic projection of a phase delay axis of the second polarizing layer attached on a side of the protective film layer onto the first polarizing layer to form an included angle;

attaching at least one second polarizing layer onto a side of the second supporting protective layer arranged on the other side of the first polarizing layer, to enable the orthographic projection of the light transmission axis of the first polarizing layer onto the first polarizing layer to intersect with an orthographic projection of a phase delay axis of the second polarizing layer attached on a side of the second supporting protective layer onto the first polarizing layer to form the included angle.

* * * * *